Nov. 16, 1954  A. S. LEVIN  2,694,556
MACHINE FOR CONVERTING MILK SOLIDS TO FLUID MILK
Filed Jan. 2, 1953  2 Sheets-Sheet 1

INVENTOR.
ABRAHAM S. LEVIN
BY Louis Necho
ATTORNEY.

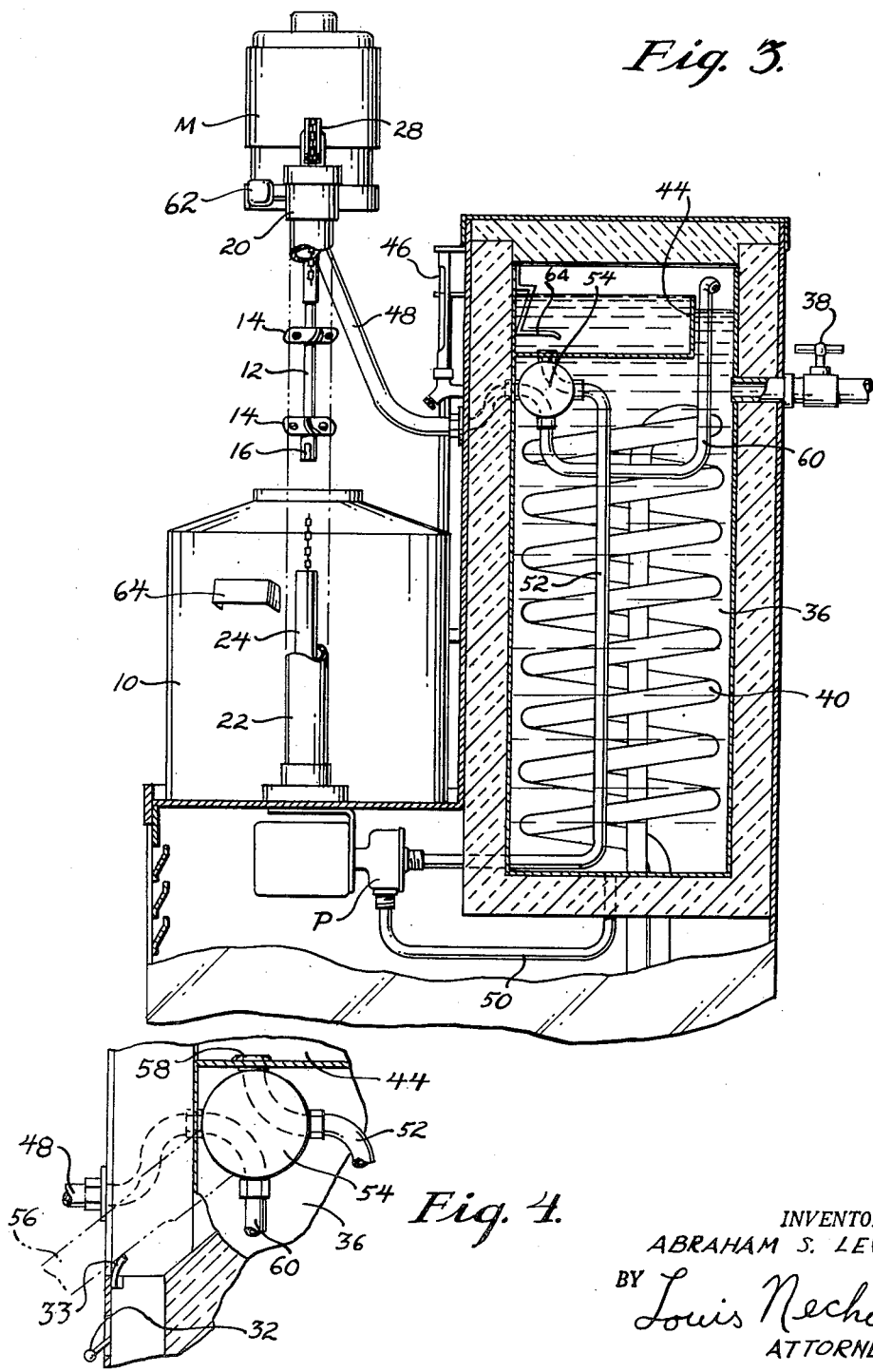

United States Patent Office 2,694,556
Patented Nov. 16, 1954

2,694,556

MACHINE FOR CONVERTING MILK SOLIDS TO FLUID MILK

Abraham S. Levin, Philadelphia, Pa.

Application January 2, 1953, Serial No. 329,208

5 Claims. (Cl. 259—24)

This invention relates to a machine adapted to convert milk solids into potable fluid milk.

One object of the invention is to produce an improved machine of the type set forth.

A further object of the invention is to produce a machine of the type set forth which is capable of producing efficiently, speedily, and in a sanitary manner, measured or predetermined quantities of suitably refrigerated fluid milk, of the proper consistency, from measured quantities of milk solids.

A still further object is to produce a machine of the type set forth which is inexpensive, simple and automatic.

These and other objects are attained by my invention as set forth in the following specification and as shown in the accompanying drawings in which:

Fig. 3 is a view, partly in section and partly in side elevation looking in the direction of line 3—3 on Fig. 1.

Fig. 4 is a fragmentary enlargement showing details of construction.

Figure 2:
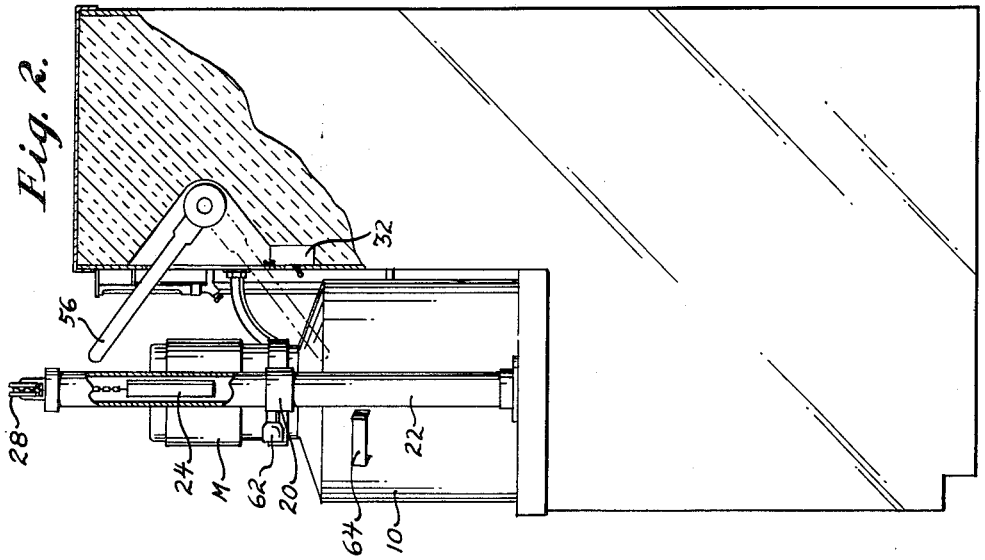
Fig. 2 is a view, partly in side elevation and partly in vertical section, of the machine shown in Fig. 1.
Figure 1:
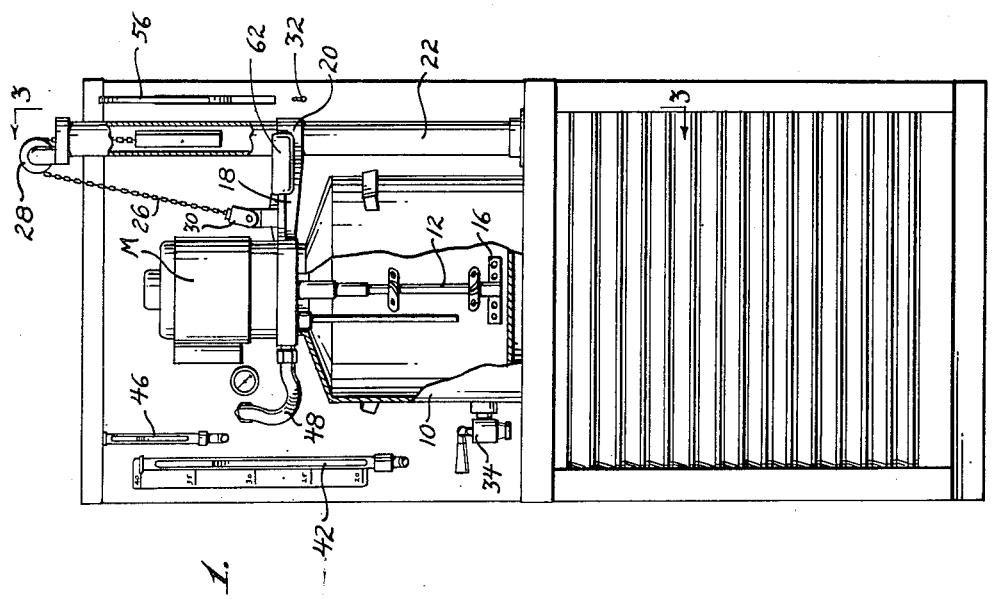
Fig. 1 is a view, partly in front elevation and partly in vertical section, showing a fluid milk reconstituting machine embodying my invention.

The machine illustrated includes a mixing tank 10 adapted to receive milk solids and water, or other fluid, to be mixed, and a beater 12 for agitating and homogenizing the mixture. The beater includes one or more vanes 14 for agitating the mixture and a bottom scraper 16 for insuring that no milk solids remain on the bottom of the tank. As shown in Figs. 1 and 3, vanes 14 are so shaped relative to the direction of rotation of the beater that they propel the water downwardly, or in the direction of the bottom of the tank. This minimizes upward splashing and agitates and washes up any milk solids which were not forced into circulation by scraper 16. The beater is actuated by a motor M which is carried by a bracket 18 which has a collar 20 for slidably engaging the exterior of a sleeve 22. The sleeve 22 is suitably mounted on the machine housing and encloses a weight 24 which counterbalances the motor M and the beater 12. The weight 24 is connected to one end of a chain 26 which passes over idle pulley 28 and the other end of which is pivotally connected at 30 to bracket 18. By this arrangement, the motor and the beater can be raised and lowered with very little effort. The motor is connected to a source of electric energy in the usual manner and it is energized or de-energized by the closing or opening of a spring loaded, push-button switch 32 which is best shown in Figs. 2 and 4 and which will be further referred to. In connection with the structure so far described, it is only necessary to add that the underside of the motor housing is so constructed that, when the motor is in its lower position as shown in Figs. 1 and 2, the mouth or inlet of tank 10 will be tightly sealed. For this purpose a gasketed seat, or any other conventional expedient, may be employed. The reconstituted milk is drained off through a suitable spigot 34.

The machine further includes a main storage tank 36 which is suitably connected, as at 38, to a source of water, or other fluid not shown. The tank 36 is provided with a conventional gage 42 to indicate the level of the liquid therein.

Within the main storage 36 is the coiled evaporator 40 of a conventional refrigerating mechanism not shown. Since refrigerating mechanisms are well known it is believed unnecessary to show or describe the same. It is sufficient to state that the refrigerating mechanism keeps the liquid at the desired temperature and that it is located below mixing tank 10 and storage tank 36 so that the entire machine is portable as a unit.

Above the storage tank 36 is a measuring tank 44 which is provided with a conventional gage 46 and which is adapted to discharge into mixing tank 10 through flexible conduit 48.

The machine further includes a pump P the intake side of which is connected, by conduit 50, to the bottom of storage tank 36 and the discharge side of which is connected, by conduit 52 to multiway valve 54. The valve is of a conventional construction and therefore its structure need not be shown nor described in detail. It is sufficient to say that if, while pump P is operating control handle 56 of the valve is raised to the position of Fig. 2, the liquid propelled by the pump will enter measuring tank 44 through conduit or fitting 58 which leads from the valve to the bottom of tank 44. When tank 44 is filled, the liquid will flow, through the open top of this tank, into storage tank 36. This effects continued recirculation of the liquid. Conversely, when the valve handle is lowered, the liquid propelled by the pump will flow, through conduit 60 to the top of storage tank 36 and the liquid in tank 44 will flow through the valve and through pipe 48 into mixing tank 10. In other words, in the upper position of valve handle 54 the measuring tank 44 is filled and the liquid is recirculated and, in the lower position of the valve handle, the measuring tank is emptied into the mixing tank and the water in the storage tank is circulated. In other words, the water is circulated as long as the pump is energized regardless of the position of the valve handle. The important thing to note is that while the measuring tank is draining into the mixing tank, no water is admitted into the measuring tank. This insures that the water reaching the mixing tank is equal to the predetermined capacity of the measuring tank.

The switch 32 may be operated manually or, as shown, it may be provided with an auxiliary spring loaded button 33 which is adapted to be pushed into circuit closing position by the valve handle 56 when the latter is in its lower position as best shown in Fig. 4. The motor M and the beater 16 may be provided with a suitable handle 62 and the mixing tank may be provided with one or more handles 64.

The operation is as follows:

Assuming that the refrigerating machinery and the pump P are in operation, that storage tank 36 has an adequate supply of water therein, and that valve handle 56 is in its upper position, the water moved by the pump will enter the measuring tank 44 through conduit 58. This serves to keep the measuring tank full and because the liquid will overflow from tank 44, it will also serve to circulate the liquid in the storage tank 36. When it is desired to make liquid milk a predetermined quantity of milk solids is placed in mixing tank 10, the motor M and beater 16 are lowered to bring the beater in within the mixing tank and to seal the mouth of the mixing tank.

The valve handle 56 is then pulled down so as to cause the water in measuring tank 44 to flow into the mixing tank and simultaneously to divert the water moved by the pump P into conduit 60 which leads to the top of storage tank 36. The switch 32 is now actuated by manually pushing button 32, (or by the valve handle pushing auxiliary button 33) to energize the motor M which drives beater 16. The reconstituted milk is drained from mixing tank 10 and valve handle 56 is moved to its upper position so as to divert the liquid moved by pump P back into measuring tank 44. It will thus be seen that the water in the storage tank is constantly circulated as long as pump P is energized, that the measuring tank is filled when the valve handle is moved to its upper position, and that, when the valve handle is lowered, the water, moved by the pump is diverted from the measuring tank so that a measured quantity of water will flow into mixing tank.

The measuring tank 44 is preferably provided with a baffle 64 which overlies the inlet 58 and dampens the splashing of the water forced into the tank by the pump while the valve handle 56 is in its upper position.

What I claim is:

1. A machine of the type set forth including a storage tank, a measuring tank located within the storage tank at a point above the bottom thereof, the measuring tank being open at the top whereby it overflows into said storage tank, a pump, a valve having one inlet opening and a plurality of outlet openings, a pipe leading from said storage tank to the intake side of said pump, a pipe leading from the discharge side of said pump to the inlet opening of said valve, a first conduit leading from a first outlet to said storage tank, a second conduit leading from a second outlet to said measuring tank, a third conduit leading from a third outlet to point outside said storage tank, and control handle for said valve, said control handle being movable to a first position in which the liquid propelled by said pump flows through said first conduit to effect recirculation of said liquid and in which the liquid in said measuring tank flows through said third conduit to a point outside said storage tank, and to a second position in which the liquid propelled by said pump flows through said second conduit to said measuring tank and, over the top thereof, to said storage tank.

2. The structure recited in claim 1 and mixing tank adapted to receive liquid flowing out of said third conduit, an impeller, a motor for rotating said impeller and means movably mounting said motor and said impeller for movement to a first position in which said impeller is disposed within said mixing tank and to a second position in which said impeller is retracted from said mixing tank.

3. The structure recited in claim 2 and means carried by said motor and said impeller and by said mixing tank for sealing the mouth of said mixing tank when said impeller is inserted into said mixing tank.

4. The structure recited in claim 2 in which the impeller rotates in close proximity to the adjacent wall of said mixing tank to prevent accumulation of solids on said wall.

5. The structure recited in claim 2, in which liquid flows into the mixing tank in a path substantially parallel, and close, to the axis of rotation of said impeller whereby the liquid is forcibly directed by said impeller against the adjacent wall of said mixing tank to prevent accumulation of solids on said wall.

References Cited in the file of this patent

UNITED STATES PATENTS

| Number | Name | Date |
| --- | --- | --- |
| 489,028 | McKinley | Jan. 3, 1893 |
| 524,206 | Keepers | Aug. 7, 1894 |
| 640,336 | Tokheim | Jan. 2, 1900 |
| 2,537,266 | Granberg | Jan. 9, 1951 |
| 2,556,494 | Farquarson | June 12, 1951 |
| 2,564,852 | Mason et al. | Aug. 21, 1951 |
| 2,612,353 | Steiner et al. | Sept. 30, 1952 |